United States Patent [19]

Hammons et al.

[11] Patent Number: 4,861,160
[45] Date of Patent: Aug. 29, 1989

[54] METHOD FOR PLANAR BEAM PATH ALIGNMENT OF A SQUARE RING LASER GYROSCOPE

[75] Inventors: Sheridan W. Hammons, Thousand Oaks; Robert H. Moore, Camarillo, both of Calif.

[73] Assignee: Litton Systems, Inc., Beverly Hills, Calif.

[21] Appl. No.: 90,559

[22] Filed: Aug. 28, 1987

[51] Int. Cl.$^4$ .............................................. G01B 11/27
[52] U.S. Cl. ...................................... 356/138; 356/350
[58] Field of Search ............... 356/153, 138, 150, 350; 372/94, 107

[56] References Cited

U.S. PATENT DOCUMENTS

| | | | |
|---|---|---|---|
| 3,581,227 | 5/1971 | Podgorski | 356/350 |
| 4,113,387 | 9/1978 | Shutt | 356/350 |
| 4,628,515 | 12/1986 | Rodloff et al. | 372/107 |
| 4,710,027 | 12/1987 | Fersht et al. | 356/350 |

Primary Examiner—Richard A. Rosenberger
Attorney, Agent, or Firm—Elliott N. Kramsky

[57] ABSTRACT

A method for aligning the light path of a square ring laser gyroscope. First, the path is aligned by translation of adjacent curved mirrors which direct a light beam through a filter-like aperture. Next, the curved mirrors are translated by equal amounts in opposite directions as determined from a measurement of the non-planar condition of opposed mirror mounting surfaces.

5 Claims, 1 Drawing Sheet

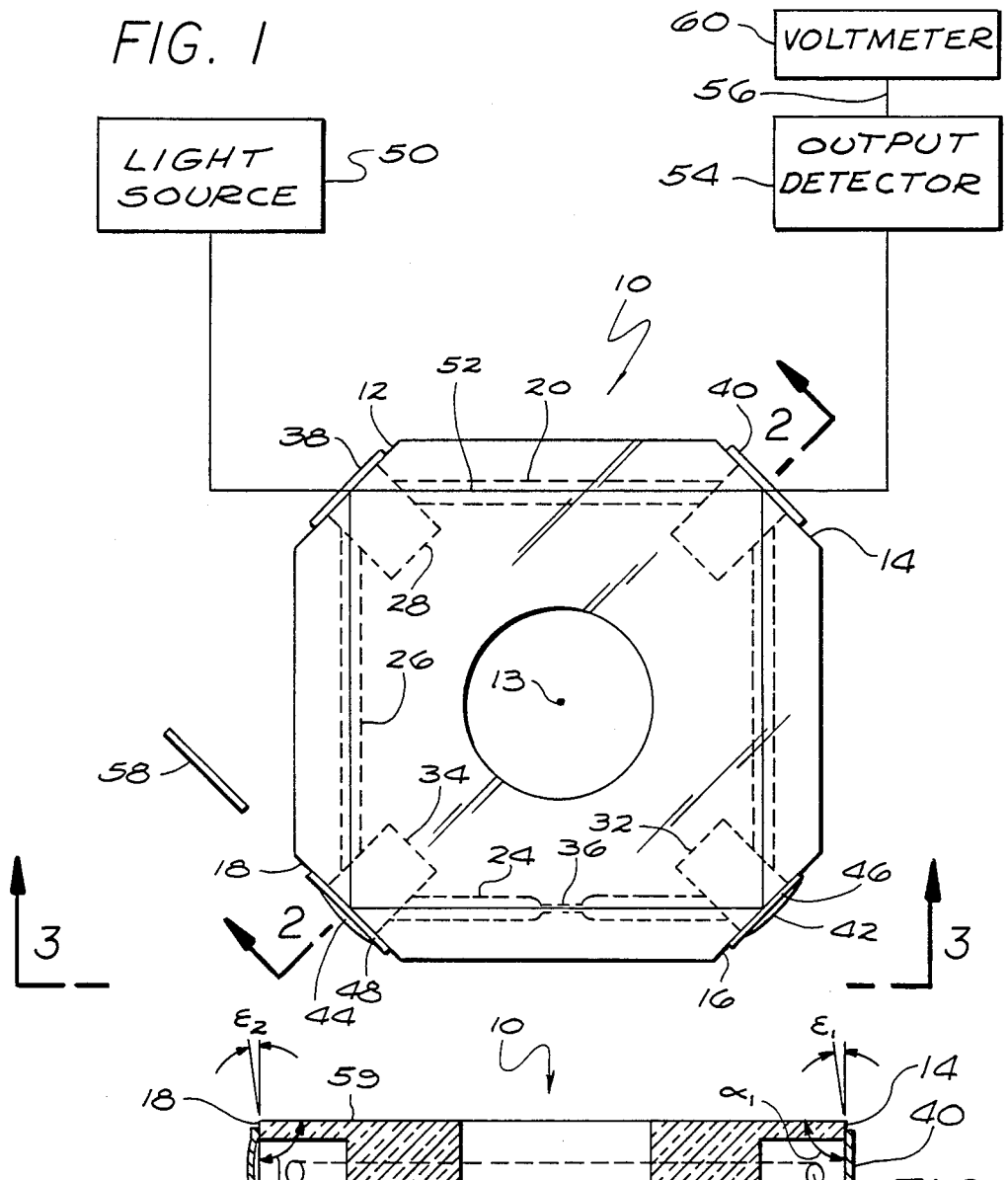
FIG. 1
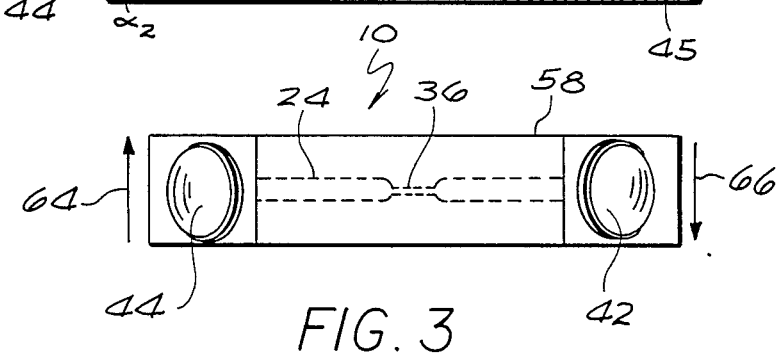
FIG. 2
FIG. 3

METHOD FOR PLANAR BEAM PATH ALIGNMENT OF A SQUARE RING LASER GYROSCOPE

This invention was made with Government support under contract F04704-84-C-0057 awarded by the Ballistic Missiles Office of the Air Force Systems Command. The Government has certain rights in this invention.

BACKGROUND

1. Field of the Invention

The invention relates to optical rotation sensing devices. More particularly, this invention pertains to a method for aligning the path of a light beam transmitted about the optical cavity of a square ring laser gyroscope.

2. Description of the Prior Art

A square ring laser gyroscope is commonly used to measure the angular rotation of a body such as an aircraft. Such gyroscopes have proven to be especially useful as "strapdown" navigation instruments as they simplify system designs by eliminating any need for a gimbaled platform. Operationally, the gyroscope accommodates two counterrotating laser beams which move within a closed square path or ring interior to a generally block-shaped frame under the influence of successive reflections from four corner-mounted mirrors. Upon rotation of the gyroscope about its input axis, the effective path length of each beam changes and a frequency differential is produced between the beams that is nominally proportional to angular rate. This differential is then measured by signal processing electronics to determine the rate.

The conventional gyroscope frame (optical block) includes planar top and bottom horizontal surfaces bordered by eight planar sides that form an octagon-shaped perimeter. Four non-adjacent sides form the mirror mounting surfaces. Each mounting surface must be parallel to the opposed mounting surface and equidistant from the center of the frame to provide an optimum (maximum intensity) beam path. Due to unavoidable manufacturing tolerances of the fabrication process and inaccuracies introduced through polishing of the various surfaces, this ideal condition is not normally realized. As a consequence, a beam path alignment process is required.

Prior art beam alignment processes do not correct for the condition of non-parallelism of opposed mounting surfaces that can result from surface "tilt" with respect to the horizontal surfaces of the gyroscope frame. As a result, the beam path of a square gyroscope (unlike that of a triangular ring laser gyroscope cavity wherein the beam path necessarily defines, and therefore lies in, a plane) is generally non-planar. Typically, the tilt angle of a mounting surface varies between plus or minus six arc-seconds.

The combination of a non-planar beam path with unavoidable stray magnetic fields, possibly generated by nearby electromagnetic devices such as accelerometers, can introduce bias into the gyroscope output. For example, in a forty (40) centimeter ring laser gyroscope without the benefit of this invention an arc-second of tilt angle produces output bias of between 0.01 to 0.04 degrees/hour/gauss. Such bias degrades accuracy and thereby limits gyroscope applications.

SUMMARY

The foregoing and additional shortcomings of the prior art are addressed and overcome by the present invention that provides a method for alignment of a ring laser gyroscope. The gyroscope includes a frame having an internal cavity that forms a square path with first and second curved mirrors fixed to adjacent corner surfaces of the frame. This method includes the step of replacing the first curved mirror with a planar mirror. A beam of light is directed into the cavity and its intensity in the cavity is measured. The second curved mirror is translated until the measured light intensity is a maximum. The planar mirror is replaced by the first curved mirror that is then translated until the measured light intensity is a maximum. Of the first and second curved mirrors ar edetermined in accordance with misalignments of the corner surface of the first curved mirror and the opposed corner surface. Finally the first curved mirror is translated in a first direction and the second curved mirror in the opposite direction by the amount of the determined translations. The tilt angles $\alpha_1$ and $\alpha_2$ of the opposed corner mirror mounting surfaces of the frame are measured. The total misalignment $\epsilon_T = \epsilon_1 + \epsilon_2$ between the opposed corner mirror mounting surfaces is calcualted and then the first and second curved mirrors are translated in opposite directions by equal amounts $d = \epsilon_T \cdot R \cdot 4.85E - 06$ where R is the mirror radius of curvature. The tilt The foregoing and additional advantages and features of the present invention will become apparent from the detailed description of the invention that follows. This description is accompanied by a set of drawing figures. Numerals point out the various features of the invention in the figures and in the detailed description, like numerals referring to like features throughout.

BRIEF DESCRIPTION OF THE DRAWINGS

FIG. 1 is a plan view of an arrangement for aligning the beam path of a square gyroscope optical frame by the method of this invention;

FIG. 2 is a sectional view of the gyroscope frame taken at line 2—2 of FIG. 1 that illustrates the tilt angles of the mounting surfaces; and FIG. 3 is an elevation view of the gyroscope frame taken at line 3—3 of FIG. 1 that illustrates the translation directions of the curved mirrors in accordance with this invention.

DESCRIPTION

Turning now to the drawings, FIG. 1 is a top plan view of an arrangement for aligning the path of a light beam about the cavity of a laser gyroscope frame 10. The alignment process of the invention provides a substantially planar beam path wherein the intensities of the counterrotating light beams attain a maximum. As a result, the optical cavity of the frame 10 reaches maximum finesse (ratio of the cavity free spectral range to the intensity response function full width at half maximum, v), an inverse measure of cavity loss, and gyroscope output is generally unaffected by the presence of magnetic fields.

The frame 10, centered about the point 13, is somewhat donut-shaped with a generally octagonal outer periphery and a circular inner boundary. It is preferably formed of glass ceramic or like material characterized by a low coefficient of thermal expansion. Representative frame materials include Pyrex and the glass ceramic material marketed under the trademarks "CerVit" and "Zerodur".

Planar mirror mounting surfaces 12, 14, 16 and 18 are formed in the periphery of the frame 10. As discussed above, the opposed mounting surfaces are generally non-parallel. Furthermore, the distances of such surfaces from the center 13 vary. An internal optical cavity of the frame 10 comprises four substantially straight cavity segments 20, 22, 24 and 26. Cylindrically-shaped wells 28, 30, 32, and 34 are provided adjacent the intersections of the segments. An aperture 36, located at the approximate center of the segment 24, is of such diameter that only the primary lasing mode of the light beam is transmitted without significant loss. Thus, such aperture 36 functions as an optical filter, eliminating undesired modes during alignment.

Mirrors 38, 40, 42, and 44 are provided for directing the beam about the cavity. Of these, the mirrors 38 and 40 are planar and partially transmissive while mirrors 42 and 44 have concave surfaces. In practice, such concave surfaces are also used to compensate for variations in beam path length resulting from flexure or expansion of the frame 10 as a consequence of thermal effects. The centers of the mirrors 42 and 44 are moved in and out with respect to the center 13 in response to sensed path length changes by path length control devices (not shown). The mirrors 38 and 40 are fixed to the adjacent mounting surfaces 12 and 14, respectively, by any of a number of methods and means that are well known in the art. Concave mirrors 42 and 44 include integral perimeter flanges 46 and 48, respectively, and are positioned so that the flanges 46 and 48 contact the adjacent mounting surfaces 16 and 18, respectively. (The curvatures of the mirrors 42 and 44 are greatly exaggerated as shown for purposes of illustration only. The radius of curvature of an actual mirror is typically greater than 200 inches.)

A light source 50, such as a HeNe laser, is provided as an element of the alignment apparatus. The output of the source 50 is directed into the optical cavity within the frame 10 through the partially transmissive mirror 38 and reflected by the gyroscope's mirror arrangement about the cavity in a beam path generally indicated by the line 52. A detector 54, such as a photodiode, senses the intensity of the light output from the cavity through the partially transmissive mirror 40 and generates an electrical signal 56 responsive thereto.

The angle of the surface of a concave mirror varies in accordance with its curvature. Thus, an incident light beam can be redirected or "steered" by translation (i.e. movement within the plane of a mounting surface) of a curved mirror. The alignment of the beam path is accomplished by such translations of the curved mirrors 42 and 44. These movements permit the reflective surfaces of the mirrors 42 and 44 to compensate for manufacturing tolerances of the mounting surfaces 12, 14, 16, and 18 by redirecting the light path. As a result, the path becomes planar and cavity losses are minimized, a condition of maximum cavity finesse.

The direction of the light beam about the cavity is readily steered by translation of one of the curved mirrors when the surfaces of all other cavity mirrors are planar. To perform such beam steering, the mirror 44 is first replaced by a planar mirror 58 (shown in shadow outline) before translation of the curved mirror 42. (Alternatively, the curved mirror 42 can be replaced with the planar mirror 58 and the curved mirror 44 then translated.)

The beam within the cavity is selectively "steered" by repeated translations of the curved mirror 42 by means of a conventional mirror movement fixture (not shown). The signal output 56 of the detector 54 is monitored by a conventional device such as a voltmeter 60 during such translations of mirror position until a maximum output is found, indicating that the primary mode is aligned within the center of the filter-like aperture 36. The initial translation of the mirror 42 is now complete. The path of the beam, however, is still non-planar if the opposed mirror mounting surfaces 14 and 18 of the frame 10 were initially non-parallel. This non-planar condition results from the reflecting surface of the curved mirror 42 compensating for non-parallelism of the opposed mirror mounting surfaces 14 and 18. The mirror 42 will then "overshoot" the desired parallelism between its reflecting surface and that of the mirror 38 occasioning a need for a second translation described below.

The planar mirror 58 is then replaced with the curved mirror 44 causing misalignment due to differences in the reflecting surfaces of the mirrors 44 and 58. The mirror 44 must therefore be translated to again steer the light beam through the center of the aperture 36. The output of the detector 54 is again monitored by the voltmeter 60 until maximum output is found indicating that the curved mirror 44 is positioned so that the beam path produces maximum finesse (highest intensity).

FIG. 2 is a cross-sectional view in elevation of the frame 10 taken at line 2—2 of FIG. 1 that illustrates the tilt angles of the opposed mounting surfaces 14 and 18. The top surface 59 of the frame 10 is substantially planar. An angle $\alpha_1$ is defined by the intersection of the top surface 59 with the mounting surface 14. Similarly, an angle $\alpha_2$ is defined by the intersection of tee top surface 59 and the mounting surface 18. Tilt angle $\epsilon_1$ is defined as $\alpha_1$ minus ninety (90) degrees while tilt angle $\epsilon_2$ is defined as $\alpha_2$ minus ninety degrees. If the tilt angles $\epsilon_1$ and $\epsilon_2$ are equal in magnitude and opposite in sign, the mounting surfaces 14 and 18 will be parallel and no further alignment is required. However, it the angles $\epsilon_1$ and $\epsilon_2$ are not, the beam path is still non-planar and the process of the invention, described below, completes alignment.

Total misalignment between the mounting surfaces 14 and 18, $\epsilon_T$, is equal to the sum of the angles $\epsilon_1$ and $\epsilon_2$. This can be measured directly by an autocollimeter or like device to an accuracy of 0.5 arc-seconds by placing the frame 10 upon a conventional precision rotary table (not shown). Alternatively, the tilt angles $\epsilon_1$ and $\epsilon_2$ can be measured directly and then summed to obtain $\epsilon_T$.

The non-planar beam path condition is corrected in accordance with the invention by again translating the curved mirrors 42 and 44. This time, the mirrors are moved in opposite directions and by equal amounts calculated in accordance with the following:

$$d = \epsilon_T * R * 4.85E-06 \text{ radians/arc-second}$$

where
d = translation distance in mils (thousandths of an inch),
$\epsilon T$ = total misalignment in arc-seconds, and
R = radius of curvature of the mirror in inches.

The equal and opposite translations of the mirrors 42 and 44 cause the beam within the cavity segment 24 to rotate about an axis that is normal to the plane of FIG. 2 at the approximate center of the aperture 36. Thus, the primary lasing mode of the light beam remains directed through the center of the aperture 36 during the method and, hence, the cavity finesse remains at a maximum.

FIG. 3 is an elevation view of the frame 10 taken at line 3—3 of FIG. 1 that illustrates the direction of translation (as determined from the sign of d as calculated above) of the curved mirror 44. For a positive d, a translation is indicated by direction 64 while a negative value of d indicates translation in the direction 66. The mirror 42 is always translated or moved opposite to the mirror 44 by the same distance d.

The above-referenced procedure for correcting for a non-planar beam path will now be illustrated with reference to FIG. 3 and the following Example.

EXAMPLE

The total tilt angle, $\epsilon_T$, of the gyroscope frame 10 with measured tilt angles of 2 and 3 arc-seconds for the mounting surfaces 14 and 18, respectively, is 5 arc-seconds. Mirror 44 has a radius of curvature of 250 inches. The translation distance, d, is computed as (5 arc-seconds*4.85 E−06 radians/arc-second*250 inches) or approximately 6 mils. This represents 1.2 mils of translation for each arc-second of misalignment.

The sign of d is positive, therefore the mirror 44 is translated in the direction 64 by 6 mils while the adjacent curved mirror 42 is translated in the opposite direction 66 by 6 mils. As a result, the reflecting surfaces of the curved mirrors 42 and 44 are now parallel to their opposed mirror reflecting surfaces 38 and 40 respectively.

The foregoing example is based upon translation of the mirror 42 first during the above process for maximizing cavity finesse. Alternatively, the mirror 44 can be the first translated. In that case, the tilt angles of the mounting surfaces 12 and 16 of FIG. 3 are measured for determination of the translation distance, d. Thereafter, the mirror 42 is translated in a direction that is determined in accordance with sign of d and the mirror 44 is then translated in the opposite direction.

Thus it is seen that a novel method for aligning a beam within the cavity of a square ring laser gyroscope has been brought to the art. By utilizing the teachings of the invention, one may align the beam path such that the optical cavity attains maximum finesse and the beam is substantially in a plane. As a result, the output of the gyroscope is unaffected by the presence of even strong magnetic fields, permitting its effective use in numerous high accuracy systems.

While this invention has been described in its preferred embodiment, its scope is not limited thereto. Rather it is only limited insofar as defined in the following set of claims and such scope includes all equivalents thereof.

What is claimed is:

1. A method for alignment of a ring laser gyroscope of the type that includes a frame having an internal cavity that forms a square path with first and second curved mirrors fixed to adjacent first and second corner surfaces, respectively, of said frame, said method comprising the steps of:
    (a) replacing said first curved mirror with an planar mirror; then
    (b) directing a beam of light into said cavity; and
    (c) measuring the intensity of said light beam in said cavity; then
    (d) translating said second curved mirror until said measured intensity is a maximum; then
    (e) replacing said planar mirror with said first curved mirror; then
    (f) translating said first curved mirror until said measured intensity is a maximum; then
    (g) measuring the tilt angles $\alpha_1$ and $\alpha_2$ of opposed corner mirror mounting surfaces of said frame; then
    (h) calculating the total misalignment $\epsilon_T = \epsilon_1 \epsilon_2$ between said opposed corner mirror mounting surfaces; then
    (i) translating said first and second curved mirrors in opposite directions by equal amounts $d = \epsilon_T \cdot R \cdot 4.85 E - 06$ where R is the mirror radius of curvature.

2. A method as defined in claim 1 wherein said first and second curved mirrors are concave.

3. A method as defined in claim 2 wherein said beam of light is produced by a laser.

4. A method as defined in claim 3 wherein said light intensity is measured by a photodetector.

5. A method as defined in claim 4 wherein said photodetector is a photodiode.

* * * * *